March 13, 1962  U. KRABBE  3,025,450
SELF-EXCITED SYNCHRONOUS GENERATOR
Filed Feb. 10, 1959  3 Sheets-Sheet 1
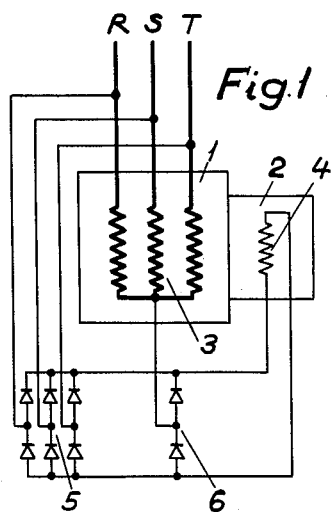
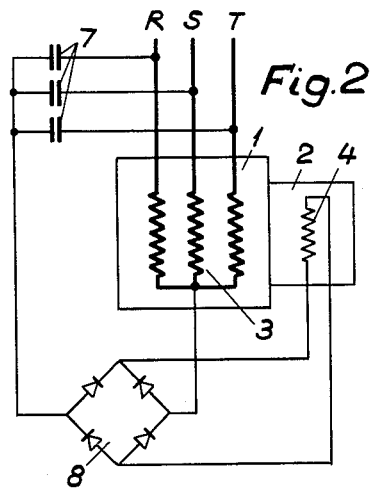
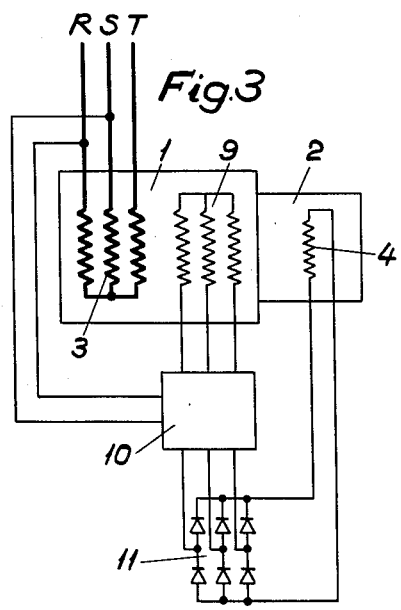
INVENTOR.
Ulrik Krabbe.
BY
Attorney.

March 13, 1962 U. KRABBE 3,025,450
SELF-EXCITED SYNCHRONOUS GENERATOR
Filed Feb. 10, 1959 3 Sheets-Sheet 2
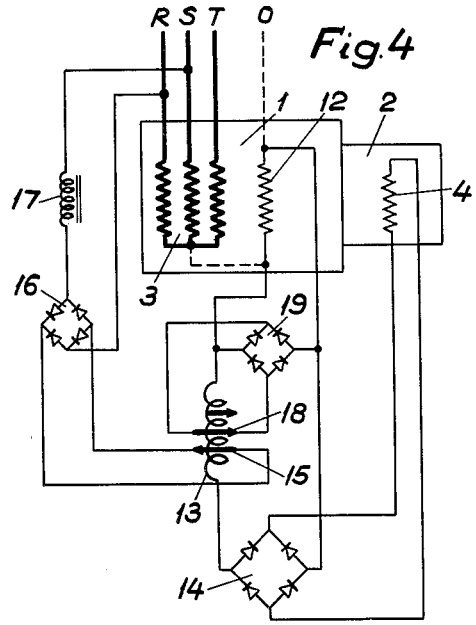
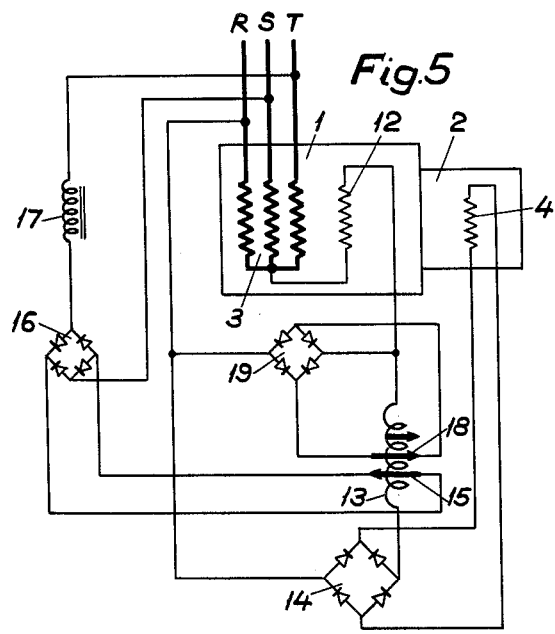
INVENTOR.
Ulrik Krabbe
BY
Attorney.

March 13, 1962 U. KRABBE 3,025,450
SELF-EXCITED SYNCHRONOUS GENERATOR
Filed Feb. 10, 1959 3 Sheets-Sheet 3
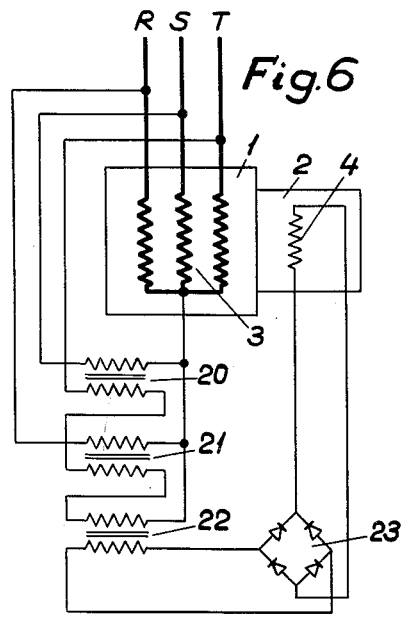
INVENTOR.
Ulrik Krabbe.
BY
Attorney.

United States Patent Office 3,025,450
Patented Mar. 13, 1962

3,025,450
SELF-EXCITED SYNCHRONOUS GENERATOR
Ulrik Krabbe, Ndr. Strandvej 50, Helsingor, Denmark
Filed Feb. 10, 1959, Ser. No. 792,312
Claims priority, application Sweden Feb. 14, 1958
13 Claims. (Cl. 322—28)

The present invention relates to a self-excited synchronous generator.

In order to avoid using a rotating exciter machine for a synchronous generator, the field winding of the generator can be connected to a rectifier which is fed with a part of the alternating current energy produced by the generator itself. In order to ascertain, in such a self-excited synchronous generator, that the excitation is maintained even when the generator is short-circuited or has a large load, at least part of the necessary excitation energy is usually taken from current transformers fed by the load current of the generator. When the generator is short-circuited, however, these current transformers cause very large electrical stresses on the rectifier, against which it is difficult to protect the rectifier, especially if it consists of germanium or silicium rectifiers. As the excitation equipment for this previously used form of self-excitation must comprise one, or usually several, three-phase groups of current transformers, a multiphase rectifier and normally also a number of reactors and a voltage regulator, the excitation equipment becomes large as well as expensive.

The object of the present invention is an excitation system for a self-excited synchronous generator which maintains the excitation even when the generator is short-circuited or the load is large and does not subject the rectifier feeding the field winding to unpermissible electrical stresses. Another object of the invention is an excitation system which does not comprise any, or at least only a small number, of current or voltage transformers and which as a whole consists of as few and simple components as possible.

According to the invention the field magnet of the generator is adapted to produce, at least when the generator is short-circuited, a substantial additional excitation component having a pole number which differs from, and preferably is larger than the pole number of the main excitation, and the voltage which this additional excitation component induces in a winding on the armature of the generator, is supplied to a rectifier feeding the field winding of the generator. The additional excitation component is given such a pole number and such a phase displacement with respect to the main excitation, that it is maintained or amplified when the generator is short-circuited. The invention consequently gives a satisfactory excitation even when the generator is short-circuited, without making use of current transformers which may cause unpermissible electrical stresses on the rectifier.

According to the invention, the additional excitation component has a larger pole number than the main excitation, the frequency of the alternating voltage supplied to the rectifier becomes correspondingly higher, due to which the regulator, which is generally necessary for the regulation of the excitation, becomes smaller.

According to one form of the invention a voltage induced by the additional excitation component is derived from the normal armature winding which carries the output current of the generator, in which case this voltage can either be used for feeding the field winding substantially only when the generator is short-circuited, whereas the necessary excitation energy during normal service is supplied in any suitable manner previously known in the art, or this voltage can, substantially alone, supply the necessary excitation energy during all service conditions.

According to another form of the invention the armature of the generator is provided, in addition to the normal armature winding carrying the output current of the generator, with an auxiliary winding with a pole number corresponding to the pole number of the additional excitation component, which auxiliary winding feeds the field winding of the generator through a rectifier.

According to a third form of the invention, the armature of the generator is also provided with an auxiliary winding with a pole number corresponding to the pole number of the additional excitation component, but the rectifier feeding the field winding is connected to this auxiliary winding in series with the armature winding of the generator.

In one form of the invention the additional excitation component consists of the harmonics which, due to the armature reaction, normally occur in the excitation when the generator is short-circuited. In a generator having a field magnet with salient poles the magnitude of these harmonics can be varied by variation of the form of the pole shoes and it is also possible to give the pole shoes such a form that, during normal service also, the excitation contains a pronounced harmonic component which has such phase displacement with respect to the fundamental of the excitation that it is amplified when the generator is loaded or short-circuited. According to the invention the third harmonic is preferably used, as this harmonic does not cause any resultant line voltages of corresponding frequency in the main armature winding of the generator.

According to another form of the invention an additional excitation component can be obtained in a generator with salient poles by distributing the field winding on the different poles so that two excitation components are produced, one with the same pole number as the number of salient poles, and the other with a pole number half as large. The correct distribution of the field windings is computed simply by superposing the different numbers of ampere turns which are necessary on the different salient poles for the two excitation components. If one, in this form of the invention, does not wish to increase the number of salient poles above the number which is necessary for the normal excitation of the main armature winding the additional excitation component, however, gets a smaller pole number than the main excitation.

In the following, the invention and some different forms of it are described with reference to the accompanying drawings in which:

FIGURE 1 shows a synchronous generator with a normal excitation rectifier, known per se, fed from the main armature winding of the generator, and in addition a special arrangement according to the invention for maintaining the excitation when the generator is short-circuited.

FIGURE 2 shows a synchronous generator according to the invention, in which the voltage which an additional excitation component induces in the main armature winding of the generator is used for the excitation of the generator during all service conditions.

FIGURE 3 shows a synchronous generator according to the invention with a three-phase auxiliary winding on the armature feeding the field winding.

FIGURE 4 shows a synchronous generator according to the invention, with a single phase auxiliary winding on the armature and a transductor regulator for regulating the magnitude of the excitation.

FIGURE 5 shows a synchronous generator wtih a single phase auxiliary winding on the armature and an excitation rectifier which is connected to this auxiliary winding in series with the main armature winding, and FIGURE 6 shows still another synchronous generator in which the voltage induced by the additional excitation component in the main armature winding of the generator is used for feeding the field winding.

FIGURE 1 shows a synchronous generator with a stator 1 and a rotor 2. The stator 1 is provided with a normal three-phase armature winding 3 which is connected to the output terminals R, S, T of the generator. The rotor 2 is provided with a normal field winding 4. During normal service the field winding 4 is fed in a manner known per se from a three-phase rectifier 5 connected to the output terminals of the armature winding 3. When the armature winding 3 is short-circuited the voltage feeding the rectifier 5, however, vanishes and the excitation should accordingly normally disappear. In order to maintain the excitation also when the generator is short-circuited, the generator is, however, according to the invention provided with an additional single phase rectifier branch 6 which is connected to the neutral point of the armature winding 3. When the generator is short-circuited, normally, due to the armature reaction, the excitation contains an increased proportion of harmonics and these harmonics induce between the neutral point and the output terminals of the armature winding 3, harmonic voltages with odd ordinals which are rectified by means of the rectifier branch 6 and consequently fed to the field winding 4 in case of a short-circuit. By variation of the form of the pole shoes of the generator, the magnitude of these harmonic voltages can be given a suitable value. It is also possible to give the pole shoes such a form that also during normal service sufficiently large harmonic voltages are produced for the excitation of the generator. As previously mentioned the pole shoes are suitably given such a form that the excitation contains a pronounced third harmonic which is in opposition to the fundamental of the excitation and consequently is amplified when the generator is loaded or short-circuited.

FIGURE 2 shows an excitation system according to the invention in which the harmonic voltages are used for the excitation of the generators during all service conditions. The FIGURE shows a synchronous generator with a stator 1 and a rotor 2. The stator 1 is provided with a normal armature winding 3 connected to the output terminals R, S, T of the generator. The rotor 2 is provided with a field winding 4 and has pole shoes with such a form that the excitation contains a pronounced harmonic of the main excitation, preferably the third. The harmonics in the excitation induce harmonic voltages in the armature winding 3 which are taken out between the neutral point of the armature winding 3 and the neutral point of a star-connected, capacitive, three-phase load 7 connected to the output terminals R, S, T of the armature winding 3 and supplied to a rectifier 8 feeding the field winding 4.

Instead of deriving the harmonic voltages for the excitation from the main armature winding of the generator, which in certain cases can be disadvantageous, the armature of the generator can be provided with an auxiliary winding as FIGURE 3 shows, which has the same pole number as the additional excitation component.

FIGURE 3 shows a synchronous generator with a stator 1 and a rotor 2. The stator is provided with a normal three-phase armature winding 3 which is connected to the output terminals R, S, T of the generator. The stator 1 is furthermore provided with a three-phase auxiliary winding 9 which has another pole number than the main armature winding 3. The auxiliary winding 9 is connected by a regulator 10 to a three-phase rectifier 11 which is connected to the field winding 4 of the generator. The regulator 10 may be of any suitable type known in the art, for instance a transducer regulator, and it regulates the current fed from the auxiliary winding 9 to the rectifier 11 with respect to the voltage between the terminals S and T of the armature winding 3 of the generator. The excitation current through the field winding 4 is consequently regulated in relation to the output voltage of the generator in such a way that this is kept substantially constant. The rotor 2, with the field winding 4, is so arranged, for instance in any of the previously described ways, that the excitation of the generator contains a component with the same pole number as the armature winding 3 and an additional component with the same pole number as the auxiliary winding 9. The auxiliary winding 9 has such a pole number in relation to the pole number of the armature winding 3 that the armature reaction which occurs when the armature winding is short-circuited or has large loads, does not essentially influence the excitation of the auxiliary winding 9, due to which the voltage of the auxiliary winding 9 and consequently also the current supplied to the field winding 4 is maintained even when the generator is short-circuited or has a large load.

By choosing the third harmonic of the main excitation as the additional excitation component which, as mentioned above, can be obtained by means of a suitable form of the pole shoes of the field magnet, the advantage is achieved that the line voltage of the armature winding 3 does not comprise any harmonic component, and a further advantage that the auxiliary winding on the armature can be a single-phase winding without jeopardising the symmetry of the output line voltage of the generator, which means that the excitation rectifier as well as the regulators which may be necessary can be single-phase apparatus.

FIGURE 4 shows a synchronous generator with a rotor 2 and stator 1 and a three phase armature winding 3 on the stator, which is connected to the output terminals R, S, T of the generator. The stator is, however, in this form of the invention, provided with a single-phase auxiliary winding 12 which in series with a self-excited transductor 13 is connected to a single phase rectifier 14 which is connected to the field winding 4 on the rotor 2. The rotor is provided with salient poles and the pole shoes have such a form that the excitation contains a pronounced third harmonic with such a phase displacement with respect to the fundamental that it is maintained or even amplified when the generator is short-circuited or has a large load. The auxiliary winding 12 has a pole number corresponding to this third harmonic. The third harmonic of the excitation causes, as is well known, no corresponding third harmonic in the line voltages of the armature winding 3 as the armature winding is star-connected. If a neutral conductor is to be connected to the generator this is made, according to the invention, in such a way that the neutral conductor is connected in series with the auxiliary winding 12 to the neutral point of the armature winding 3 as shown by the dotted line in FIGURE 4. If the polarity of the auxiliary winding 12 is correct the voltage components of the third harmonic in the armature winding 3 and the auxiliary winding 12 will neutralize each other so that the phase voltages between the output terminals R, S, T of the generator and the neutral terminal O, do not contain any substantial third harmonic. The transductor 13 is provided with a control winding 15 counteracting the self-excitation, which is fed by a rectifier 16, which in series with a saturable reactor 17 is connected to the output terminals R and S of the generator. The transductor 13 is further provided with a control winding 18 cooperating with the self-excitation which is fed from a rectifier 19 connected across the auxiliary winding 12.

Consequently, the transductor 13 regulates, in a manner known per se, the current through the field winding 4 in such a way that the output voltage of the armature winding 3 is kept at such a value that the currents through the control windings 15 and 18 of the transductor neutralize each other. As the voltage across the auxiliary winding 12 is not absolutely constant and independent of the load of the generator, neither is the current through the control winding 18 constant. The current through the control winding 15 will consequently vary a little with the load of the generator but as this current is derived from the output voltage of the armature winding 3 by means of a non-linear impedance consisting of the saturable reactor 17, these variations in the current are correspondingly only very slight variations in the voltage of the armature winding 3. The arrangement has, furthermore, the very great advantage that an additional constant voltage source feeding the control winding 18, which would be the conventional way of controlling the transductor, is unnecessary.

In certain cases it is advantageous to take a portion of the excitation energy from the armature winding of the generator and another portion from an auxiliary winding. FIGURE 5 in the accompanying drawing shows such an arrangement. This arrangement is essentially identical to the arrangement shown in FIGURE 4. The auxiliary winding 12 which has a pole number corresponding to a third harmonic in the excitation is, however, series connected to the armature winding 3 in such a way that the voltage induced by the third harmonic in the auxiliary winding 12 cooperates with the voltage which the third harmonic induces in the armature winding. Further, the rectifier 14 feeding the field winding 4 is connected in series with a transductor 13 to the series connection consisting of the auxiliary winding 12 and one phase R of the armature winding 3. The cooperating control winding 18 of the transductor 13 is also fed from the voltage across the armature winding 12 in series with the phase R of the main armature, whereas the counteracting control winding 15 is fed through the saturable reactor 17 from the voltage between the phase terminals S and T of the armature winding. The transductor 13 operates, consequently, in the same way as in FIGURE 4. During normal conditions the rectifier 14 is fed by a component with the main frequency of the generator from the armature winding 3 and in addition a component from the auxiliary winding 12 and the armature winding 3 which has a frequency corresponding to the third harmonic of the excitation and the magnitude of which is dependent on the value of the load. When the generator is short-circuited, however, the component with the main frequency vanishes and the rectifier 14 is fed only by a component produced by the third harmonic. The proportion between the two voltage components supplied to the rectifier 14 can easily be regulated by connecting the rectifier 14 to different points on the phase winding R of the armature winding 3.

FIGURE 6 shows still another form of the invention in which a component corresponding to the fundamental of the excitation as well as a component corresponding to the third harmonic are supplied to the field winding, in this case, however, only from the main armature winding of the generator. Also in this case, consequently, the field magnet of the generator is so arranged that it produces an excitation containing a pronounced third harmonic, which causes a phase voltage with corresponding frequency in the armature winding 3 of the generator. The excitation equipment consists essentially of three transformers 20, 21, and 22. The transformers 20 and 21 are, with their primary windings, connected between the phase terminals S and T respectively, and the neutral point of the armature winding 3. The primary winding of the transformer 22 is connected in series with the secondary windings of the transformers 20 and 21 between the phase terminal R and the neutral point of the armature winding. This series connection is so made that the fundamentals in the phase voltages at least partly neutralize each other so that a comparatively small voltage with the fundamental frequency of the generator is achieved across the secondary winding of the transformer 22, whereas the third harmonics in the phase voltages are added to each other so that a large voltage with the frequency of the third harmonic is obtained across the secondary winding of the transformer 22. This winding is connected to a rectifier 23 feeding the field winding 4 which consequently is fed both by a voltage component produced by the fundamental of the excitation and a voltage component produced by the third harmonic in the excitation. The proportion between the magnitudes of these two voltage components can be easily determined by means of the ratios of the transformers 20, 21, and 22.

The arrangements described above are only given by way of example and several other forms are possible within the scope of the invention.

I claim:

1. A self-excited synchronous generator comprising an armature winding and a field magnet with a field winding, a rectifier means connected to said field winding, means to furnish to said rectifier means, during normal operation, excitation energy derived from the alternating current produced by the generator, said field winding producing, at least when the generator is short-circuited, a substantial additional excitation component with a pole number which differs from the pole number of the excitation produced during normal operation, and means operable when the generator is short-circuited to supply the voltage induced in said armature winding by said additional excitation component to said rectifier means.

2. A self-excited synchronous generator as claimed in claim 1, said field magnet having salient poles and said field winding being distributed among said poles to produce two excitation components, one of them having the same pole number as the number of said salient poles and the other one having a pole number half as large.

3. A self-excited synchronous generator as claimed in claim 1, said field magnet having salient poles with pole shoes, said pole shoes having such a form that the excitation contains a pronounced harmonic.

4. A self-excited synchronous generator as claimed in claim 3, said pole shoes having such a form that said harmonic has such a phase displacement with respect to the fundamental of the excitation that it is amplified when the generator is loaded or short circuited.

5. A self-excited synchronous generator as claimed in claim 1, in which said armature winding carries the output current of the generator.

6. A self-excited synchronous generator as claimed in claim 5, in which said rectifier means includes a three-phase rectifier connected to said armature winding and feeding said field winding in normal operation, and a single phase rectifier connected to the neutral point of said armature winding for rectifying the voltage induced in said armature winding by said additional excitation component and feeding it to said field winding.

7. A self-excited synchronous generator as claimed in claim 5, comprising a symmetric, auxiliary load star-connected to the phases of said armature windings, said rectifier means being connected between the neutral points of said auxiliary load and said armature winding.

8. A self-excited synchronous generator as claimed in claim 5 comprising two transformers having primary windings connected between one phase terminal each and the neutral point of said armature winding, and a third transformer having a primary winding connected in series with the secondary windings of said two first mentioned transformers between the third phase terminal and the neutral point of said armature winding, said rectifier means being connected to a secondary winding of said third transformer.

9. A self-excited synchronous generator as claimed in claim 1, said armature winding including winding parts carrying the output current of the generator and an additional winding part having a pole number corresponding to the pole number of said additional excitation component, said rectifier means being connected to said additional winding part.

10. A self-excited synchronous generator as claimed in claim 9 in which said rectifier means is connected to said additional winding part in series with at least a portion of said output-current carrying winding parts.

11. A self-excited synchronous generator as claimed in claim 9 provided with a self-excited transductor connected in series with said rectifier means for regulating the current fed to said field winding, said transductor being influenced by a first control quantity derived, by means of non-linear impedances, from the voltage across said armature winding and a second control quantity derived from the alternating voltage feeding said rectifier and said transductor.

12. A self-excited synchronous generator as claimed in claim 9 in which said auxiliary winding part is a single phase winding part.

13. In a self-excited synchronous generator as claimed in claim 12, a neutral conductor connected in a series with said auxiliary winding part to the neutral point of said armature winding.

References Cited in the file of this patent
UNITED STATES PATENTS

| | | |
|---|---|---|
| 1,843,724 | Junken | Feb. 2, 1932 |
| 2,740,084 | Haas | Mar. 27, 1956 |
| 2,882,480 | Bradburn et al. | Apr. 14, 1959 |